US012683073B2

(12) United States Patent
Elfman

(10) Patent No.: US 12,683,073 B2
(45) Date of Patent: Jul. 14, 2026

(54) METHOD OF EFFICIENTLY TRANSFORMING ENERGY USING A MULTIFILAR INDUCTOR WITH AT LEAST THREE SWITCHABLE WINDINGS

(71) Applicant: Richard H. Sherratt and Susan B. Sherratt Trust Fund, Alameda, CA (US)

(72) Inventor: Brian Elfman, Alameda, CA (US)

(73) Assignee: Richard H. Sherratt and Susan B. Sherratt Revocable Trust Fund, Alameda, CA (US)

( * ) Notice: Subject to any disclaimer, the term of this patent is extended or adjusted under 35 U.S.C. 154(b) by 691 days.

(21) Appl. No.: 18/070,166

(22) Filed: Nov. 28, 2022

(65) Prior Publication Data

US 2023/0088782 A1 Mar. 23, 2023

Related U.S. Application Data

(63) Continuation of application No. 17/599,428, filed as application No. PCT/US2021/014421 on Jan. 21, 2021, now Pat. No. 11,538,626.

(60) Provisional application No. 62/964,442, filed on Jan. 22, 2020.

(51) Int. Cl.
*H01F 7/06* (2006.01)
*H01F 27/28* (2006.01)
*H01F 27/40* (2006.01)
*H01F 27/42* (2006.01)

(52) U.S. Cl.
CPC ......... *H01F 27/40* (2013.01); *H01F 27/2823* (2013.01); *H01F 27/42* (2013.01)

(58) Field of Classification Search
CPC .. H01F 27/2823; H01F 27/2895; H01F 27/40; H01F 27/42; H01F 37/00; H01F 2027/406; H01F 2027/408
See application file for complete search history.

(56) References Cited

U.S. PATENT DOCUMENTS 3,222,882 A 12/1965 Sutton
7,750,501 B2 * 7/2010 Huang .................. H02M 7/797 307/25
9,287,701 B2 3/2016 Elfman
9,713,993 B2 7/2017 Elfman
10,814,806 B1 10/2020 Elfman
11,271,511 B2 * 3/2022 Glose ...................... B60L 53/20
2009/0127857 A1 5/2009 Feng
2010/0085129 A1 4/2010 Shuto
2019/0097447 A1 3/2019 Partovi

* cited by examiner

*Primary Examiner* — Paul D Kim
(74) *Attorney, Agent, or Firm* — Staniford Tomita LLP

(57) ABSTRACT

Embodiments of a multifilar inductor with at least three windings that are switchable, having a power assigned winding denoted as P1, a suppression assigned winding denoted as B, a containment assigned winding denoted as T, a switching apparatus to switch assignments between the P1, B and T windings; and a capacitor bank, wherein B suppresses the back EMF generated by a pulse power, T contains field emitted EMF generated by the pulse power. The input pulse power input is converted to a constant current output into the capacitor bank such that its time duration is extended by the combination of the inductor windings plus the capacitor bank to thereby minimize the peak inductance below the inductor's saturation point.

7 Claims, 14 Drawing Sheets

1302

| Containment | | Suppression | | P1 Power Winding | |
|---|---|---|---|---|---|
| S21a1 | S21a2 | S22a1 | S22a2 | S23a1 | S23a2 |
| Pin 2 | Pin 5 | Pin 1 | Pin 4 | Pin 3 | Pin 6 |

1304

1306

| Suppression | | Containment | | P1 Power Winding | |
|---|---|---|---|---|---|
| S21b1 | S21b2 | S22b1 | S22b2 | S23b1 | S23b2 |
| Pin 1 | Pin 4 | Pin 3 | Pin 6 | Pin 2 | Pin 5 |

1308

1310

| Containment | | Suppression | | P1 Power Winding | |
|---|---|---|---|---|---|
| S21c1 | S21c2 | S22c1 | S22c2 | S23c1 | S23c2 |
| Pin 3 | Pin 6 | Pin 2 | Pin 5 | Pin 1 | Pin 4 |

1312

1400

| MODE | LOAD |
|---|---|
| P1+C | Continuous Full Load |
| P1++C | Continuous Full Load<br>P1 Switching Continuously<br>Between Charging SV Bank |
| $P1+R_{LOAD}$ | Occasional Overload |
| $P1++R_{LOAD}$ | Intermittent Overload |
| P1++P1 | Switching Two Windings In Parallel |

FIG. 14

METHOD OF EFFICIENTLY TRANSFORMING ENERGY USING A MULTIFILAR INDUCTOR WITH AT LEAST THREE SWITCHABLE WINDINGS

CROSS-REFERENCE TO RELATED APPLICATIONS

This application is a Continuation of U.S. patent application Ser. No. 17/599,428 filed Sep. 28, 2021, now U.S. Pat. No. 11,538,626, which is a U.S. national phase application of PCT/US2021/014421 filed on Jan. 21, 2021, which claims priority to U.S. Provisional Patent Application 62/964,442, filed on Jan. 22, 2020 and entitled "High-Energy, Scalable, Pulse Power, Multimode Multifilar-Wound Inductor."

TECHNICAL FIELD

Embodiments are generally directed to magnetic structures, such as inductors, for efficient energy transformations.

BACKGROUND

An inductor is defined as any magnetic-material form (i.e., circular, e-core, c-core, d-core, and so forth) wound in any fashion by copper (or equivalent) wire of an inductive structure; where the core may be air or a material having a magnetic property for example, ferrite, laminated iron alloys, power iron, and amorphous alloys, or any combination of such. This also includes nanocrystalline materials.

Inductors are multifaceted in that they may be also parallel-wound with multiple wires in various configurations as multifilar windings. The windings nomenclature herein may be denoted as: a double wire-wound inductor may be called bifilar; a triple wire-wound inductor may be called trifilar; and a four-wire wound inductor may be called quadrifilar, and so on. Further, the nomenclature may alternatively denote an inductor with two or more windings variously referred herein as "multifilar" or such as may be denoted by two, three, four or more windings.

One novel attribute of a multifilar wound inductor is how adding a capacitance attenuates over-voltages (e.g., U.S. Pat. No. 4,358,808). In yet another example (e.g., U.S. Pat. No. 5,166,869) bifilar winding practice is applied to eliminate capacitors as such windings inherently increase winding capacitance. In yet another example, a quadrifilar solution is applied to solve common mode issues (e.g., U.S. Pat. No. 4,679,132).

Generally, as high electric energy (i.e., on the scale of megajoules, MJ) is transformed from a high voltage energy system, the current demands may run into the tens of thousands or more of amps. Control of which is sometimes served by a switching function S into an inductor L. Concurrent to this is the fact that an inductance L of a inductor may be mutually exclusive of copper wire gauge. For example, a specific-sized toroid core may calculate 20 mH to be wound with 118 turns, such that the windings' calculations are wholly independent of whether wound with 20 gauge or 16 gauge copper wire (or equivalent). As larger gauge copper wire adds to inductor size, weight, cost, and efficiency; so does the inductor increase its thermal and electromagnetic (EM) signature, where EM relates generally to the entire EM spectrum including the near and far electric and magnetic fields from Extremely Low Frequencies (ELF) to infrared (IR). In many applications these latter EM generations must be subdued. Such applications may include, for example, military use like autonomous marine craft.

In carrying out their respective assignments, military and civilian services may run into unforeseen and perhaps last-resort circumstances that depend on delivery of ultra-reliable, high-availability short term bursts of regulated high energy to assist and/or prevent potential threats to survival. This regulated high-energy may be transformed into one or more useful voltages; whereas the unforeseen high energy demands may be further conditioned on abating the generation of any potential or possible EM signature. Such abatement is an essential property in many applications, such as military marine operations.

Other needs for last resort or high reliability, high-energy power systems may include grid, micro-grid and off-grid isolated power and standby applications. For example, stand-alone backup power for high-rise electricity failures to prevent elevator stranding, temporary lighting and alarm systems, and also for extending fuel capacity for diesel/gas power generators, particularly in construction and harsh environments (e.g., polar environments).

Such ultra-reliability, high availability applications may be met by imposing space and military hi-reliability specifications, which are often prohibitively expensive and complicated. Nonetheless, minimizing the number of components in a system generally ensures the best chance for highest reliability. To these ends, by eliminating switch-mode (i.e., 'buck converter') topographies in favor of pulse mode forms distinctly minimizes the numbers of components.

What is needed, therefore, is a high energy multimode, multifilar wound inductor that transforming megajoule-scale energy into single or multiple useful voltages while also minimizing temperature rise, abating generation of EM fields, and minimizing copper wire size to thereby reduce inductor size, weight, cost, and efficiency, while primarily achieving adiabatic loading.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 14 illustrates a table 1400 that lists the different loads for the different P1 switching modes, under some embodiments.

SUMMARY

Figure 1:
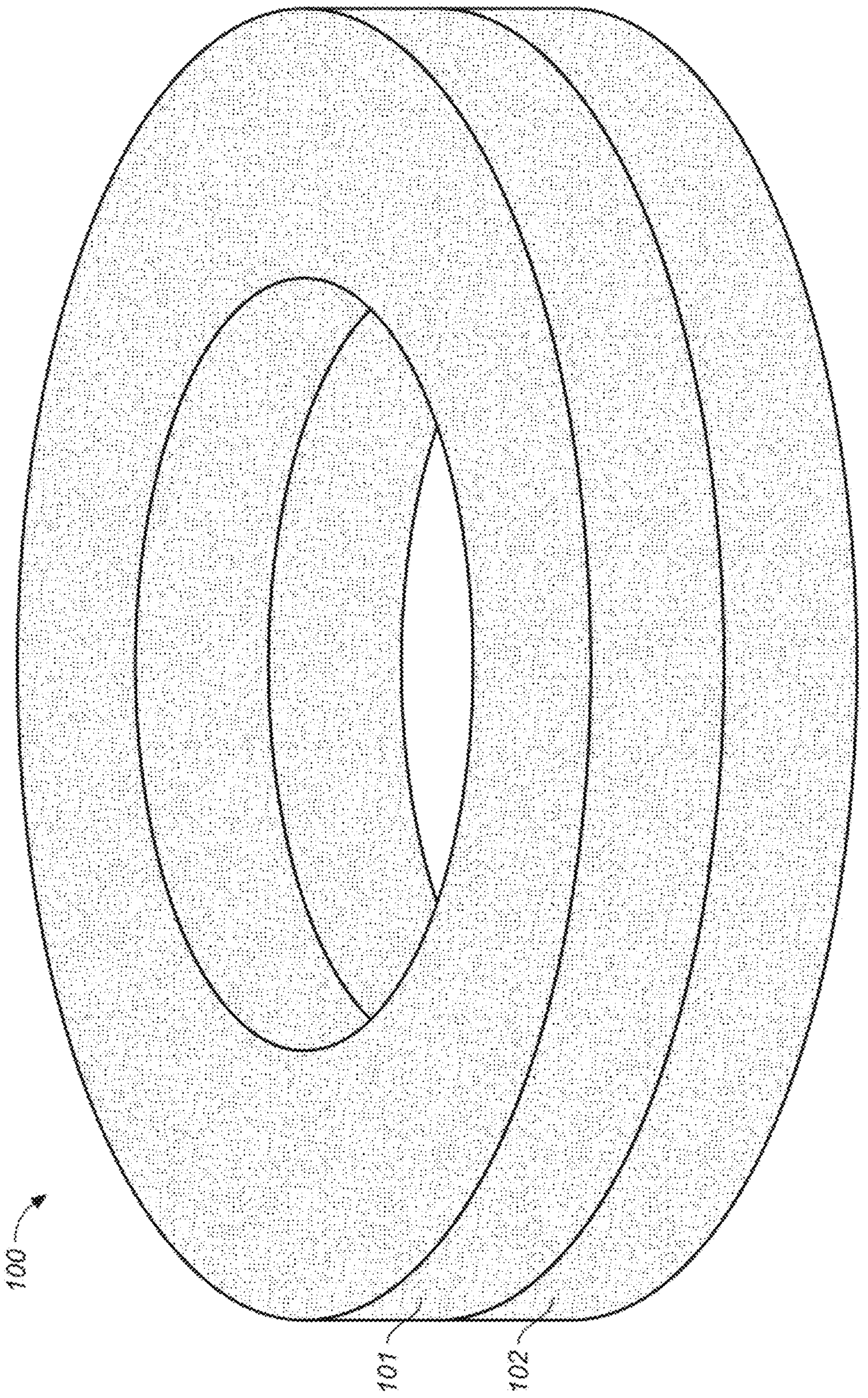
FIG. 1 illustrates a toroidal core comprising a material around which copper (or equivalent) wire is wound for an inductor, under some embodiments.

The disclosed embodiments herein relate to the fabrication, form and functions of a pulse power, multimode, multifilar wound inductor. More specifically, a scalable, multimode high energy pulse power inductive component implemented by a multifilar wound magnetic core.

The disclosed embodiments also relate to the use of multifilar wound magnetic structures to enhance energy transformation, improve adiabatic loading effectiveness, and diminish back EMF. More specifically, an efficient magnetic structure incorporates a multifilar wound magnetic core to increase energy transformation, suppress temperature rise, and minimize transient EMF.

Embodiments of multiple windings in a magnetic structure to dissipate back EMF. When in certain embodiments said windings are wound in parallel such windings may be denoted as being 'bifilar' wound meaning two conductors (wires) in parallel or 'trifilar' wound meaning three conductors in parallel. However, the windings may comprise more than two or three wires in parallel.

DETAILED DESCRIPTION

A detailed description of one or more embodiments is provided below along with accompanying figures that illustrate the principles of the described embodiments. While aspects of the invention are described in conjunction with such embodiments, it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device or component within a larger system, a method, or an article of manufacture.

Multifilar Inductor

As a basic electronic component, magnetic structures design may include consideration of certain complex vector quantities. One of these, namely magnetic flux saturation, $B_{sat}$ of a magnetic structure media (material) may be classified into several media categories, such as ferrite, powder, iron alloys and so forth, each with its typical $B_{sat}$ point. Of these materials ferrite may have among the lowest $B_{sat}$. Each category of magnetic material may possess certain advantages compared to other materials. For example, certain efficient qualities of ferrite may be desirable despite its comparatively lower $B_{sat}$ and Curie temperature. Ferrite may thus possess certain superior parameters, but may have the lowest $B_{sat}$. For certain high power/high current applications a lower $B_{sat}$ may present formidable $B_{max}$ (maintaining a lower than $B_{sat}$) limitations. Embodiments of a pulse power, multimode, multifilar inductor overcome some of these limitations.

While it is possible to design and produce a more $B_{sat}$ tolerant material (i.e., powder) where $B_{max}$ of such ferrite design may exceed $B_{sat}$. For example, there may be list of priority materials, such as: ferrite, first; powder, second; and so on. In such a case, where ferrite cannot tolerate the power of a design, the designer can move down to the next priority material. Embodiments of the multifilar inductor described herein are not limited to only one such magnetic media or material.

One possible remedy for alleviating ferrite's low $B_{sat}$ point for high currents may be to insert a gap into the magnetic structure. More specifically, certain magnetic structures such as toroidal forms may lend themselves to gap practice. Embodiments of the multifilar inductor described herein may be used with a gapped or ungapped magnetic structure.

Embodiments include a high energy, multimode, multifilar wound inductor that transforms megajoule-scale energy into single or multiple useful voltages. The inductor features means to minimize temperature rise plus abating generation of electromagnetic field (EMF) effects while minimizing copper winding wire sizes. This reduces inductor size, weight, cost, and efficiency, and achieves adiabatic loading.

In an embodiment, the inductor is configured as a toroidal ferrite inductor L. FIG. 1 illustrates a toroidal core comprising a material, such as ferrite, around which copper (or equivalent) wire is wound. As shown in FIG. 1, the core may be a single unitary piece, or it may be a compound unit made of two or more stacked cores. For the example of FIG. 1, a two-piece stacked toroidal core having cores 101 and 102 is shown, but embodiments are not so limited, and any practical number of cores may be stacked depending on application needs and constraints. The multiple or compound cores 101 and 102 may be joined or fixed together using known connections methods, or they may be simply placed together and joined through the wire windings.

Figure 2:
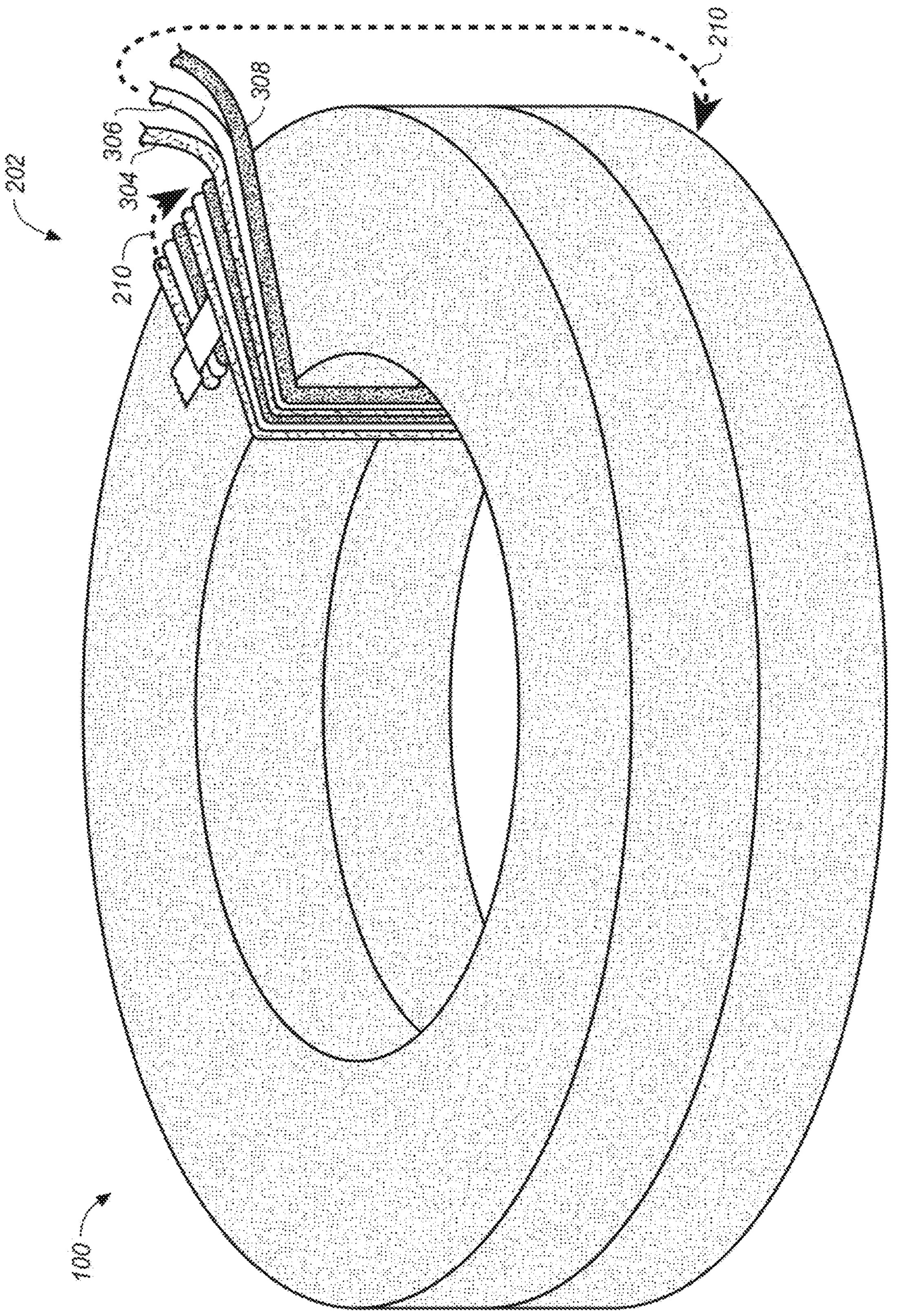
FIG. 2 illustrates the toroidal magnetic structure of FIG. 1 with a winding of three wires partially wound from a start point around a portion of the toroidal core.

In an embodiment, the toroidal core 100 is wrapped with a number of individual copper wires. The windings may be bifilar (two wires), trifilar (three wires), quadrifilar (four wires), and so on to produce a multifilar inductor. Embodiments described herein will be directed to a trifilar inductor, but it should be noted that other numbers of wires are also possible. FIG. 2 illustrates the toroidal magnetic structure 100 of FIG. 1 with a set of three wires partially wound from a start point around a portion of the toroidal core(s) to form winding 202. In FIG. 304, the three wires are denoted 304, 306, and 308, and may be of different colors or shades to differentiate themselves, such as yellow, green, and red. They are wrapped in an alternating pattern, such as green-yellow-red-green-yellow-red (or 304-306-308-304-306-308 . . . ), and so on. The wires may be of a uniform gauge and thickness depending on application needs, and will be described as copper herein, but other similar materials may also be used. The three wires are generally wrapped as a single layer onto the core 100, and in a prescribed direction (i.e., either clockwise or counter-clockwise) as shown by the dashed direction arrow 210. The windings may be started by tacking down one end of the wires with adhesive, tape (as shown) or other similar fixing means.

Figure 3:
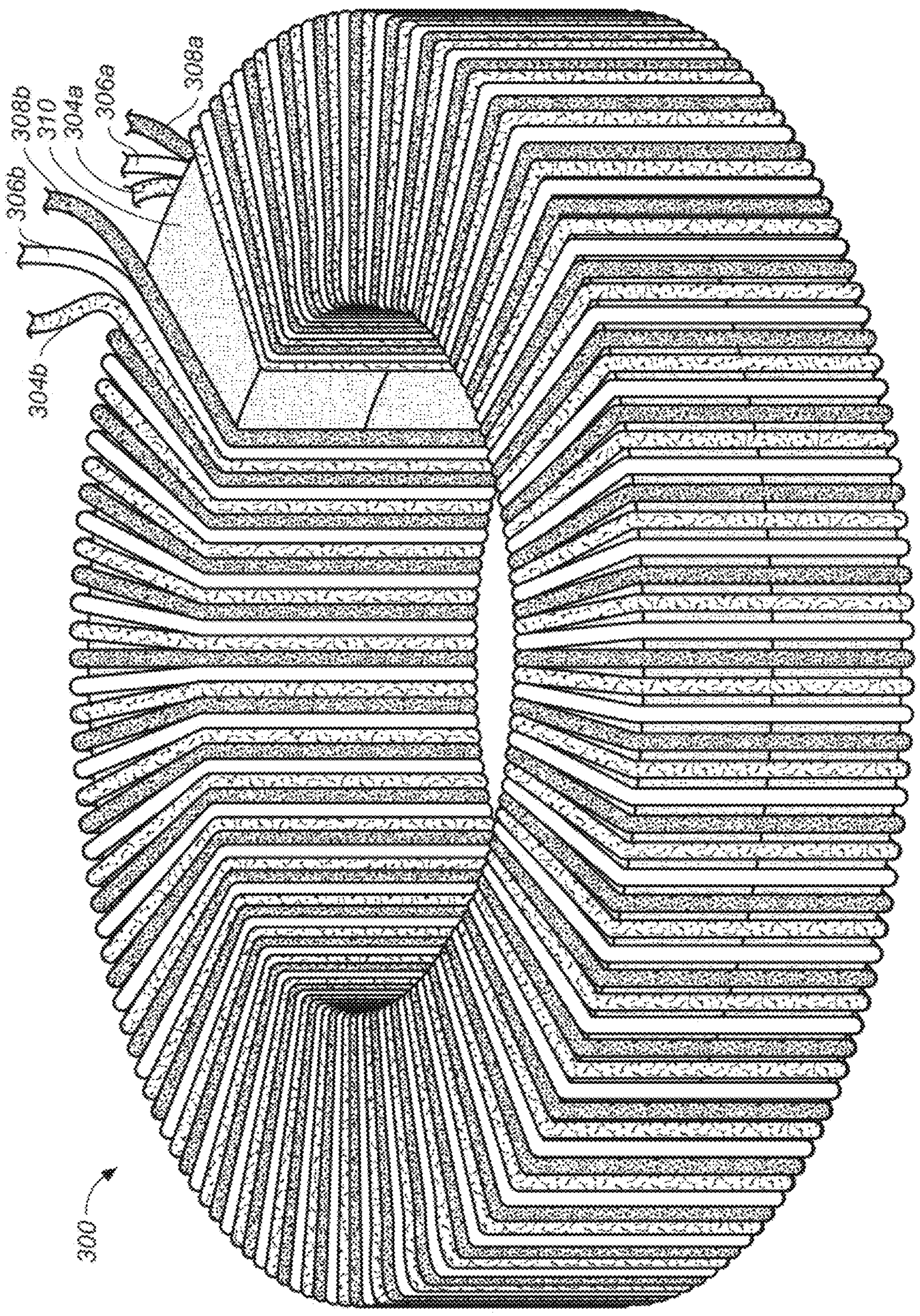
FIG. 3 illustrates a completely wound trifilar inductor of FIG. 2, showing a start and stop point under some embodiments.
Figure 5A:
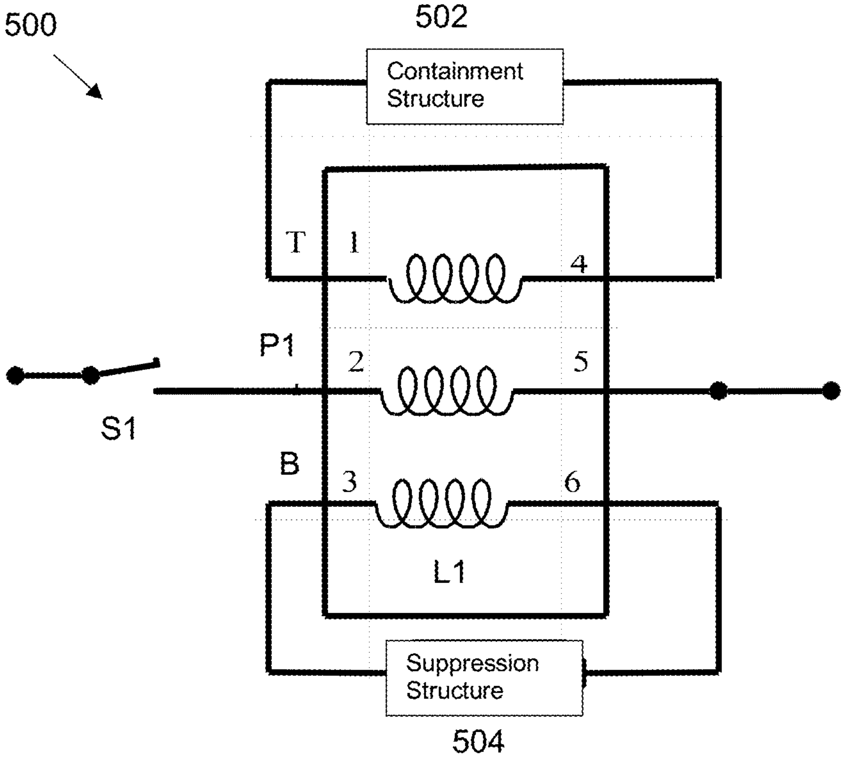
FIG. 5A illustrates a pulse power topography using a multifilar inductor, under some embodiments.

FIG. 3 illustrates a completely wound trifilar inductor 300, under some embodiments. In this embodiment, the three wires are started at a starting point denoted 304*a*, 306*a*, and 308*a*. The wires are wrapped in the prescribed direction (clockwise or counter-clockwise) around the toroidal core until the desired end (or stop) point is reached. The wires are then cut to produce end leads 304*b*, 306*b*, and 308*b*. The two sets of leads 304*a*-306*a*-308*a* and 304*b*-306*b*-308*b* are used as the input and output leads respectively for the inductor when it is used in a circuit, such as shown in FIG. 5A below.

The wire gauge and spacing between the individual wires 304, 306, and 308 can be varied. That is, they can be wrapped tightly next to each other or with a certain amount of space between them. They may be of the same gauge or different gauges, and they may be insulated or uninsulated, as appropriate. The wire wrap can also extend as much as desired along the toroidal core. Thus, as shown in the FIG. 3, there is a space 310 between the start of the wires and the end of the wires. The space 310 may be formed of any distance between the beginning and end of the wires, as required. For the embodiment shown, a relatively small space 310 is provided, such as on the order of 5 to 10 degrees along the circle defined by the face of the toroid. In other embodiments, a larger space may be used, such as 15 to 20 degrees, or any other spacing. This space 310 minimizes HB field perturbations that might arise if the ends of the wires were wound directly adjacent to or against the start of the wires. The configuration of the space 310 in terms of its area proportional to the total area of the core and/or the number of windings can be altered depending on the application needs and constraints.

Figure 4:
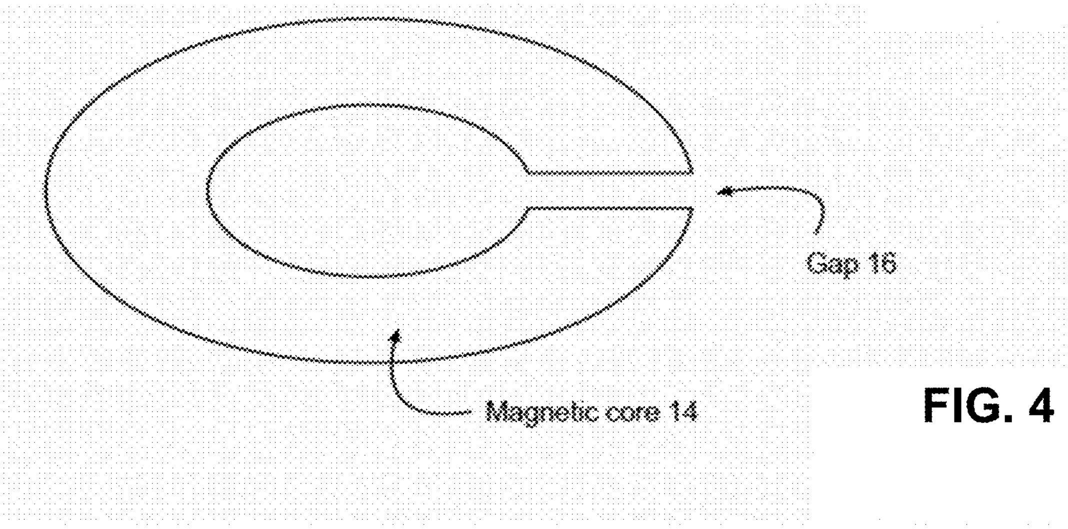
FIG. 4 illustrates a toroidal magnetic core that is configured with a gap in the core material.

As stated above, ferrite inductors may exhibit a low $B_{sat}$ point at high currents, and one way to alleviate this effect is to insert a gap into the magnetic structure. The toroidal magnetic structure of FIG. 1 lends itself to a gap configuration. Thus, in an embodiment, the toroidal core itself may be gapped, such that an opening or slot is opened in the ferrite body of the core. Such gapped toroids represent another class of inductive B/H operation. In this case, the saturation curve is moved over somewhat to allow more current flow. The gap may be of any appropriate size, but generally, inductance decreases with increased gap size. Thus, the wider the gap, the lover the inductance. Furthermore, with a gapped toroid, it should be noted that most of the energy J is stored in the gap. FIG. 4 illustrates a toroidal magnetic core that is configured with a gap. As shown in FIG. 4, the magnetic core 14 is formed with a gap 16. The gap 16 may be of sized to optimize the advantageous effect of alleviating the low $B_{sat}$ point of the ferrite core. When gapped in this manner, the orientation of the windings 304, 306, and 308 along with any spacing 310 between the start and end leads should be configured accordingly, such that the windings cover the gap or is within the winding spacing, if necessary.

As used herein, multifilar windings 202 refer to parallel magnetic wires, which refers to an article of manufacture containing at least two magnetic wires which are all locally parallel to each other which may form a ribbon with each of the wires electrically isolated from the other by insulative material. In some embodiments, the magnetic wires may or may not be individually coated with electrical insulation. The magnetic wires may or may not be embedded in parallel between two sheets of insulative material, which are brought together to bond the wires and the insulative material together to make the create the parallel bonded magnetic wire ribbon. The insulated magnetic wires may then be arranged in parallel to each other, and may be bonded together to form a parallel bonded magnetic wire ribbon. The magnetic wires may be primarily composed of a metal, for instance copper or aluminum, an alloy of two or more metals, of a layered wire, possibly containing an inner layer of aluminum and an outer layer of copper. Another alternative layer wire may contain an inner layer of copper and an outer layer of aluminum.

Pulse-Power, Multi-Mode Circuitry.

In an embodiment, the multifilar (trifilar) inductor 300 is used in a pulse power topography. FIG. 5A illustrates a pulse power topography using a multifilar inductor, under some embodiments. In such a pulse power circuit 500, the inductor L1 may be implemented in a pulsed power switched unipolar ungrounded configuration by a switch S1 applying DC pulse energy to a power winding P1. For the embodiment shown in FIG. 5A, the three windings of inductor 300 (L1) are denoted P1 (for power winding), B (for bifilar windings), and T (for trifilar winding). The B winding is used to diminish the reactive element consequential to the trailing edge of the power pulse delivered by the switch S1. The T winding is used to abate the residual reactive element, and this abatement also effectively subdues emitted EMF from the inductor.

Figure 5B:
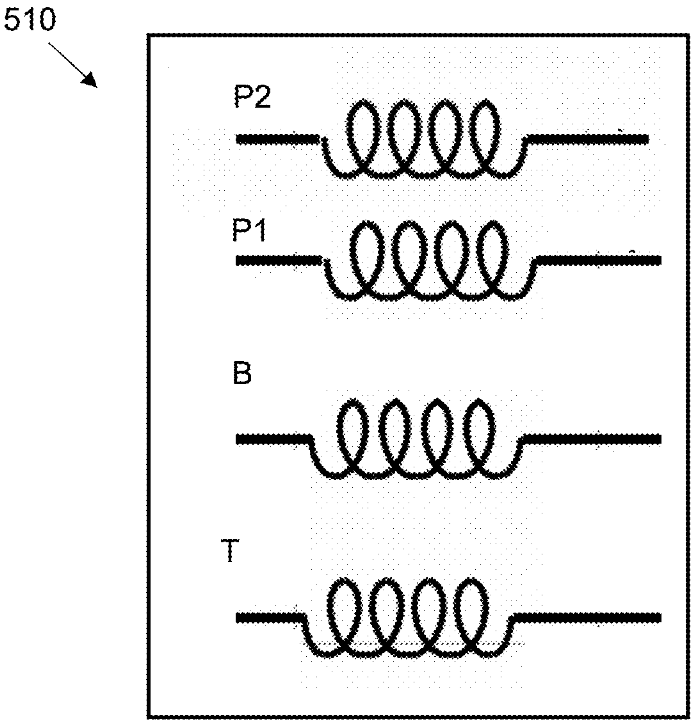
FIG. 5B illustrates an inductor with two power windings P1 and P2 along with the T and B windings, under an example embodiment.

The P1 power winding denotes the first or only power winding in a trifilar inductor. If more than three windings are used, additional power lines P2, P3 and so on may be used. Such an example is illustrated in FIG. 5B, which shows an inductor 510 with two power windings P1 and P2 along with the T and B windings. Any number of power windings may be provided as denoted P1 to Pn. An inductor with one power winding P1, along with the B and T windings, is a trifilar inductor; an inductor with two power windings, P1 and P2, along with the B and T windings, is a quadrifilar inductor, and so on.

Figure 6:
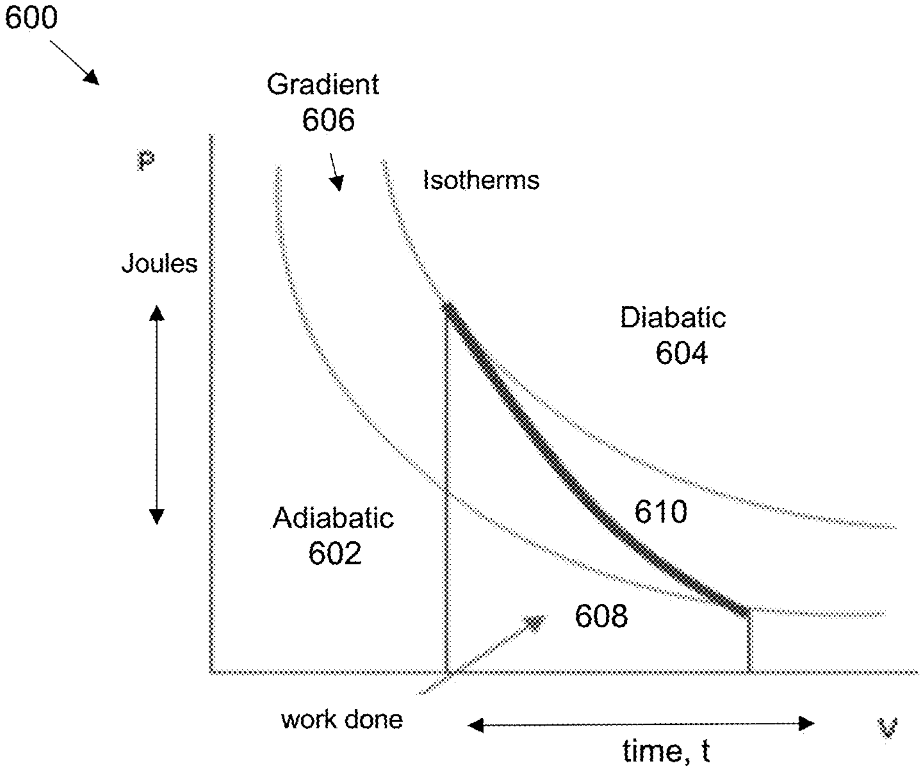
FIG. 6 is a graph illustrating a plot of power versus time between the adiabatic gradient and diabatic divergence of a multi-mode, multifilar inductor, under some embodiments.

In an embodiment, the thermal resistance of the ferrite trifilar-wound toroidal form is increased to such a degree that even megajoule energy transforms by the switch into L1 may not pose a thermally transfer copper wiring temperature rise, thus effecting a degree of adiabatic loading. This is a consequence of the inductor inductance μ that may be inside of the thermal-transform time $t_T$. FIG. 6 is a graph illustrating energy (in Joules) versus time between the adiabatic gradient and diabatic divergence of a multi-mode, multifilar inductor, under some embodiments. In FIG. 6, the x-axis (V) denotes time, $t_T$, and the y-axis (P) denotes current, I in terms of the energy in Joules. As $t_T$ increases, or as I increases, power across P1 moves towards the isotherm; or better, a more possible temperature transform exists. In graph 600, a gradient 606 separates the adiabatic region 602 from a diabatic region 604. The amount of work done 608 is derived by a curve 610 defined within the gradient 606 between two specific points along the time-scale (x-axis). The inductor embodiment entails a relief, such that a power dissipation results by Equation 1.0 as follows:

$$I^2R*\theta ja*\text{duty cycle}=\text{temperature rise} \quad \text{[Equation 1.0]}$$

The adiabatic process region 602 in chart 600 represents the region where energy is transferred from circuit 500 only as work only, without the transfer of heat or mass.

As shown in FIG. 5A, the inductor L1 has a set of input terminals and output terminals from the three windings T, P1, and B. These are denoted respectively as inputs 1, 2, and 3, and outputs 4, 5, and 6. Thus, winding T has input lead 1 and output lead 4, winding P1 has input lead 2 and output lead 5, and winding B has input lead 3 and output lead 6. With respect to the physical inductor 300 of FIG. 3, these wire leads correspond on the inputs as follows: 304*a*=1, 306*a*=2, and 308*a*=3; and on the outputs as: 304*b*=4, 306*b*=5, and 308*b*=6. In an embodiment, the use and configuration of these different input and output leads provides a multi-mode function to the inductor when used in a circuit such as circuit 500. That is, the mode of the inductor within the circuit can be changed by switching between the different input and output leads. For example, by switching the P1 winding from line 1 to line 2, the duty cycle can be reduced significantly.

Figure 7:
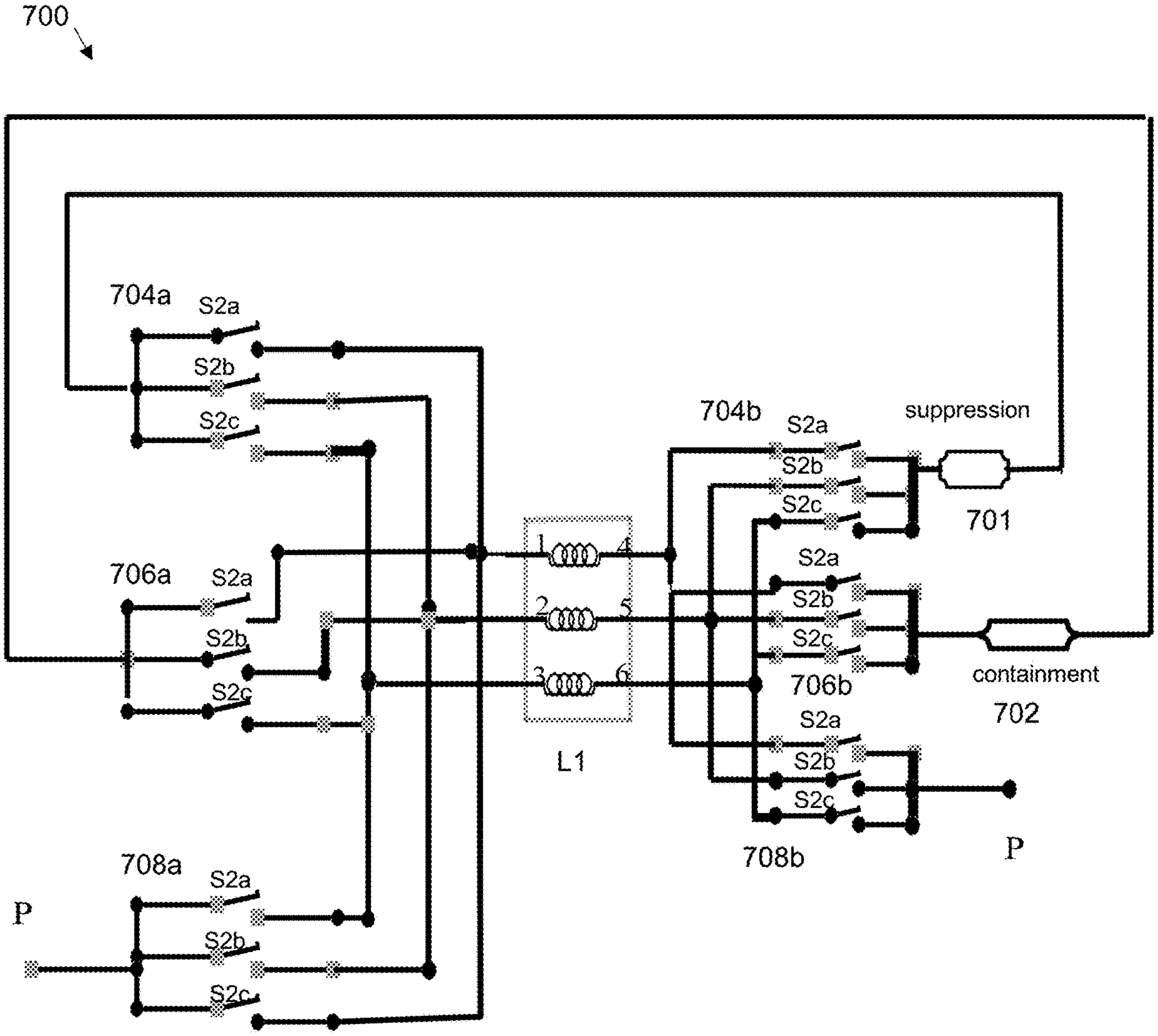
FIG. 7 illustrates an open switch topography for a pulsed power, multi-mode, multifilar inductor circuit using a multiplexed switching matrix, under some embodiments.

In an embodiment, the switching function between the three sets of windings is implemented through a multiplexed switching matrix. FIG. 7 illustrates an open switch topography for a pulsed power, multi-mode, multifilar inductor circuit using a multiplexed switching matrix, under some embodiments. As shown in FIG. 7, circuit 700 comprises a set of three multiplexed switching matrices denoted 704*a*, 706*a*, 708*a* on the input side and 704*b*, 706*b*, and 708*b* on the output side. Each of the three sets has three switches denoted S2*a*, S2*b* and S2*c*. Different modes of switching are described in greater detail with respect to FIGS. 13 and 14 below.

The multimode function goes beyond just switching P1 between windings. For example, an embodiment may switch the B winding in parallel to P1, thus effectively providing a P1, P2 winding for even higher power transforms. Similarly, parallel T windings may be provided.

Although embodiments describe the use of a single trifilar inductor, additional multimode functions made be possible by adding a second trifilar wound inductor, or other additional multifilar wound inductors.

This provides a degree of scalability to circuit 700 wherein the number of possible combinations is limited only by the possible number of permutations between windings and inductors. This provides scaling of power levels across a significant range of operation.

As shown in FIG. 5A, circuit 500 includes a containment structure 502 and a suppressor structure 504. In the multi-mode embodiment of FIG. 7, these correspond to containment component 702 and suppression component 701, respectively. In an embodiment, the suppression component 701 comprises a diode to provide a degree of EMF suppression.

Figure 8:
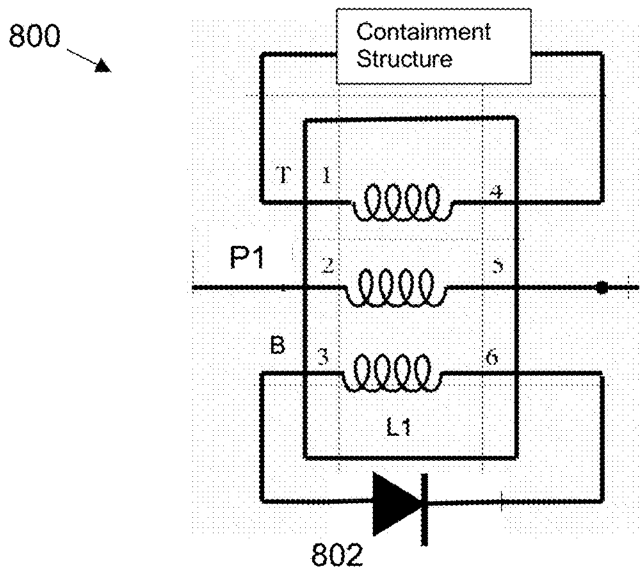
FIG. 8 illustrates the inductor circuit of FIG. 5A with a suppression circuit comprising a steering diode, under some embodiments.

FIG. 8 illustrates the inductor circuit of FIG. 5A with a suppression circuit comprising a steering diode 802. The diode 802 in circuit 800 may be embodied as any appropriate diode device or other current blocking circuit. In usual high voltage, high power applications of toroidal inductor 300, a suppression circuit or component must always be provided and enabled. This is because high voltage spikes generated by EMF effects may damage or destroy associated electronics in the system. Although FIG. 8 illustrates a diode device as the suppression circuit, embodiments are not so limited, and other devices including semiconductor circuits can also be used. However, because of the high spurious voltages suppressed, semiconductor steering requires expensive components, but generally do not warrant the cost; hence, a steering diode 802 usually suffices.

Figure 9:
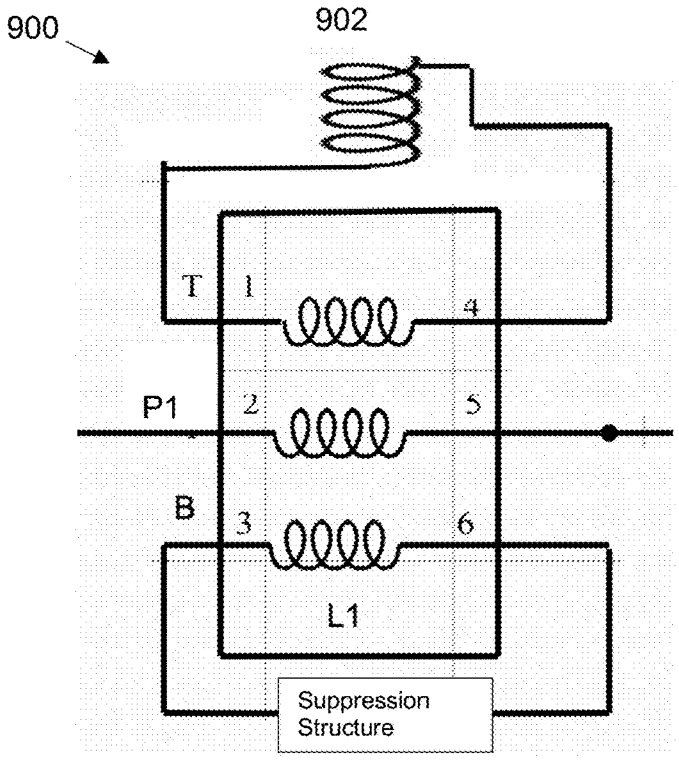
FIG. 9 is a schematic diagram that illustrating the inductor circuit of FIG. 5A with a containment structure comprising an extended wire, under some embodiments.

The containment component 702 is also configured to provide EMF suppression. It does so by generating an opposition flux such that EMF in each winding is canceled out to thereby abate the electromagnetic near and far fields generated in the course of pulse power duty cycles. In an embodiment, the containment circuit comprises a T (trifilar) winding enhancement that is implemented through an extended copper wire wound outside of the toroid. This wire is to laid in a circular manner on top of the toroid and in the opposite layering to the direction of the P1, B, and T windings. The electromagnetic containment is thus enabled by an extended T winding which is encased or packaged as part of the toroid structure 300. The EMF containment winding may be provided on one side or both sides of the toroid and works by reverse current cancelling reactive EMF transmission. FIG. 9 is a schematic diagram that illustrating the inductor circuit of FIG. 5A with a containment structure comprising an extended wire 902. As shown in circuit 900, wire 902 is coupled to the end leads of the T winding and extends above the circuit and the toroid itself.

Figure 10:
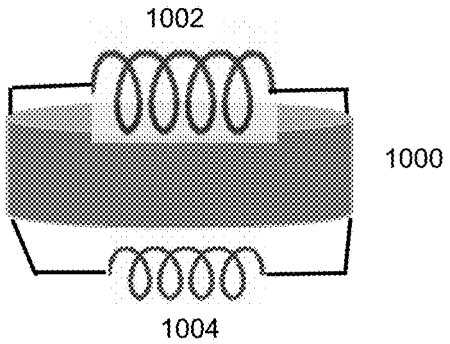
FIG. 10 illustrates the EM containment winding of FIG. 9 positioned with respect to the toroidal inductor, under some embodiments.

FIG. 10 illustrates the EMF containment winding of FIG. 9 positioned with respect to the toroidal inductor, under some embodiments. As shown in FIG. 10, a coiled wire winding 1002 connected to the T winding of inductor 1000 is laid along the top of the inductor. The wire may be placed on either side of the inductor. An additional EMF containment winding 1004 may also be provided on the opposite side of the inductor, as shown. The containment wire or wires can be of any appropriate gauge, length, and composition, depending on the inductor design and application requirements.

As described above, both the suppression and containment components help alleviate or abate issues posed with back EMF effects. With respect to these EMF effects, back EMF generally refers to an induced Electromagnetic Force (EMF) that opposes the direction of current which induced, and is a significant issue with respect to both static and dynamic operation of inductive circuits in high energy applications, such as large-scale gensets.

EMF is an electromagnetic force or field, also known as an electric potential. When a changing current is applied across a wire wound magnetic structures a transient EMF will be produced across its switch contacts by a back EMF created by the decay of the inductor's B field when said switch turns OFF. In many cases, such transient EMF effects are unwanted as they tend to adverse effect connected and/or adjacent components. For example, the transient EMF of a relay coil acting on its on-off switch controlling operation of a magnetic structure may cause arcing across its metal contacts. Such adverse transients impair energy efficiencies. However, just how much energy is lost depends on the magnetic structure's circuit topography and the magnetic structure's physical configuration. In addition, where AC transients follow one set of energy-loss calculations. DC transients follow another set of energy-loss calculations. An example embodiment of the foregoing DC transients energy-loss calculations, are that of certain inductor with cores that include (but are not limited to) powder or ferrite material. Furthermore, such cores may be shaped in many geometric forms. For example, but not limited to, C cores, E cores, and as well as toroidal forms.

The efficiencies measured in certain inductors in a certain test case were improved by replacing the E/C type wound core inductor with a toroidal (toroid) wound core inductor. Along with this, a 1200 V vacuum relay S1 was replaced with a 600V MOSFET switch. Clearly, being a MOSFET, a semiconductor is perhaps far more susceptible to transient EMF anomalies than its replaced vacuum relay. This is illustrated as shown by the derivative: −L(dI/dt), where L is inductance, I is current and t is time. The minus (−) sign signifies a back EMF. For illustration of the disparate time frames, the replaced vacuum relay contacts open and close in the units of milliseconds (ms), whereas the MOSFET can be enabled and disabled in units of microseconds (μs)/ Electromagnetic (EM) basics parallel Ohm's law. V=I×R (thus, as current does not change when S1 turns OFF, only voltage must change) it is then apparent that V in a transient EMF will be potentially many times more destructive, or in other words, generally as t becomes shorter.

One approach to ameliorate dangerous transient EMF is to incorporate snubbers. However, snubbers are limited to specific voltages. That is, certain kinds of high-energy capacitor storage require high-voltages, such as: $J=CV^2/2$, where J=energy in Joules, V=voltage, and C=capacitance. Such high-voltages decrease exponentially e.g., 50% voltage decrease equates to 75% of its energy (or voltage/energy swing), thus greatly increasing the difficulty of designing in voltage-sensitive snubber circuits. Moreover, snubber circuits may be made more efficient as well. Snubber circuits are not limited to diodes. But may include metal-oxide varistors (MOV), and similar circuits. Many circuit designers build snubbers with combinations of these components.

Another such approach to ameliorate transient EMF are multifilar magnetic structure windings, as described herein, where multifilar windings means winding parallel wires. For example, the bifilar converter had been identified as the most promising for lowest cost power electronic converters, requiring only one ground-referenced switch per phase to achieve unipolar excitation or two ground-referenced switches per phase to achieve bipolar excitation. Numerous bifilar wound magnetic structures can be supported by various power converter topographies.

However if, and only if, the back EMF can be suppressed or further suppressed at the magnetic structure, then the diodes and MOV's would be even more effective and thus dissipate less energy, or perhaps not even be required. Therefore, a better way to suppress transient EMF is to suppress the back EMF at the magnetic structure. The suppressor and containment structures in FIG. 5A thus provide an effective way to suppress the back EMF at the magnetic structure. It should be noted that the magnetic structure described herein includes, but is not limited to, any electrical inductive device, but excludes traditional coil-driven mechanical relays.

An example embodiment is described with its inductor as toroidal, ungrounded, and at a DC bias level with unipolar excitation. Such a device may be used in conjunction with a switch or switching matrix and a high voltage (HV) and service bank, such as described in U.S. Pat. Nos. 9,287,701 and 9,713,993, which are assigned to the assignee of the present application and are hereby incorporated by reference in their entirety. One side of the switch may be connected to the HV bank and the other side may be connected to then toroidal inductor L1. Accordingly, S1 may be opened (enabled) for a set period T or otherwise closed. Thus, when S1 is enabled a DC pulse provides the excitation across the high side of L1. Whereas the L1 low side is connected to the SV bank. With regard to certain L1 issues. First, assume a ferrite toroid inductor at a high current I perhaps 100 A or more, and an inductance 1.0 H (Henry), and the following Equation 2.0:

$$\ell e = (\pi OD * ID)/\ln(OD/ID) \quad \text{[Equation 2.0]}$$

In the above equation, the le in cm equals the MPL (Magnetic Path Length), OD is the toroid's outside diameter, and ID is the toroid's inside diameter.

With high-energy, high-current applications, any magnetic structure must fit within the limits placed by the following equation 3.0:

$$H = (0.4\pi NI)/\ell e \quad \text{[Equation 3.0]}$$

In the above equation, the left side H in Oersteds (Oe) equates to the source EMF. The right side equates to the relationship between circular size of the toroid le in centimeters divided into the product of the number of windings times the peak current N times I. (Note: the 0.4 π represents a conversion between MKS & CGS of notation systems).

The number of turns N, can be found using one of several approaches, such as through the use of an online inductance calculator. For copper wire gauge 'g', assume for 100 A either 10 g or 8 g. Thus, the number of turns determines wire length. Once Nis determined, H can be determined using the equation above.

For example, if I=100 A, H could well come out in the 70's of Oe. Here, ferrite saturates at around 15 Oe. Certain testing showed no saturation at what was thought to be a peak current three times the $B_{sat}$ point, but instead, the actual peak current turned out to be inside the $B_{sat}$ point.

The slope of the wave shape of curve 200 is an integration of energy over time that reduces down to approximately that given in the following equation 4.0:

$$\int_a^{bx} f(x)dx \quad \text{[Equation 4.0]}$$

The peak current of the slope of the wave shape is far less than a hypothetical static computation indicates. The bifilar-wound inductor (L1) thus provides two attributes. First, it alleviates back EMF, and second, when coupled to an SV capacitor bank, it increases the energy transform inside of $B_{sat}$.

Certain tests have also indicated that there is little or no temperature rise during operation of the inductor. To start with, in ferrite copper wire wound toroids, the principal resistance is from the copper wires. Mathematically, the temperature rise equals the current (I) squared times the copper wire resistance multiplied by the time of current across the inductor, all divided by the capacitance. Thus, as shown in Equation 5.0:

$$\Delta T = I^2 T \Delta t / C \quad \text{[Equation 5.0]}$$

This temperature rise effect is denoted as adiabatic loading. That is, the time of energy transformed is so short so as to not cause thermal dissipation. Thus, in addition to the foregoing two attributes, given ferrite has a relatively low Curie Temperature point; a third and vital attribute of adiabatic loading is provided.

Energy Transform System

Figure 11:
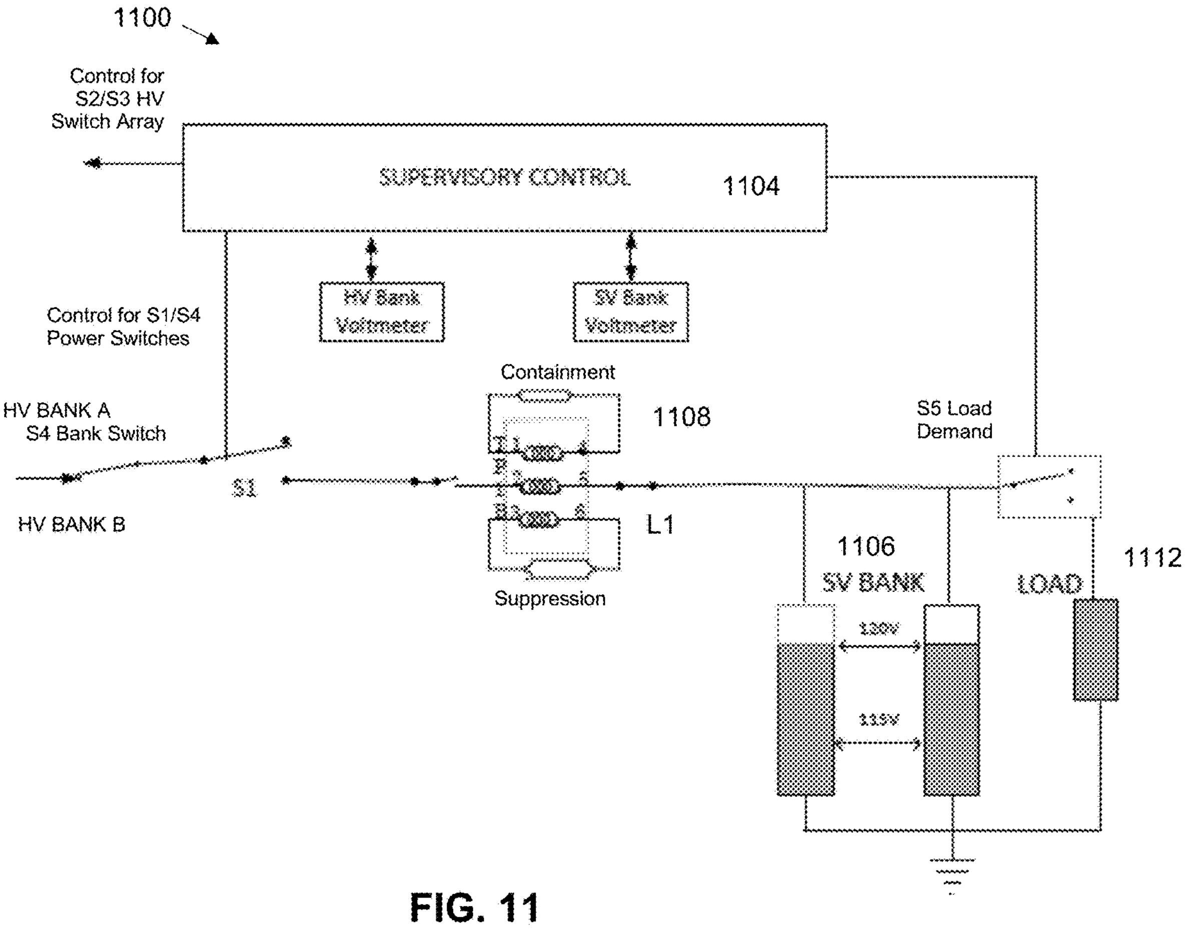
FIG. 11 illustrates an energy transform system using a multifilar inductor system of FIG. 5A, under some embodiments.

As stated above, the pulse power, scalable, multimode, multifilar inductor circuit of FIG. 5A may be used in an energy transform system, such as a high-energy capacitive conversion system. FIG. 11 illustrates an energy transform system using a multifilar inductor system of FIG. 5A, under some embodiments. As shown in diagram 1100 of FIG. 11, supervisory control unit 1104 is disposed between a high voltage (HV) bank and a service bank (SV) 1106. The HV bank has two banks, bank A and bank B, each with a number of stacked supercapacitor cells, and two-section switching to transfer energy among the cells between and within each bank. The SV bank section 1106 has an SV bank storage system coupled to load 1112 through load switch S5. The transfer of energy to the SV bank 1106 is controlled by switches S4 and S1 and inductor L1. In an embodiment, L1 is a trifilar-wound toroid inductor 300, and is in a suppression/containment circuit 1108 and corresponding to that shown in FIG. 5A.

FIG. 11 is a block diagram of the supervisory control, switching and inductor connections to the SV bank, under some embodiments. As shown in diagram 1100, the S4 bank switch selects between bank A and bank B of the HV bank section. This switch setting along with a control signal from the supervisor/y control unit 1104 controls the state of switch S1, which engages or decouples the inductor L1. Energy from the HV bank section is fed through inductor L1 (when switch S1 is closed) to the SV bank 1106 and on to load 1112 through load demand switch S5. As shown in FIG. 11, the SV bank has a voltage that is maintained between 115V and 120V, for example. The SV bank is shown at 120V and the trigger point to charge is set at 115V. Diagram 1100 illustrates an amount of separation that is intended to emphasize the ability to control the voltage at 117.5V+/−2.5V.

Figure 12:
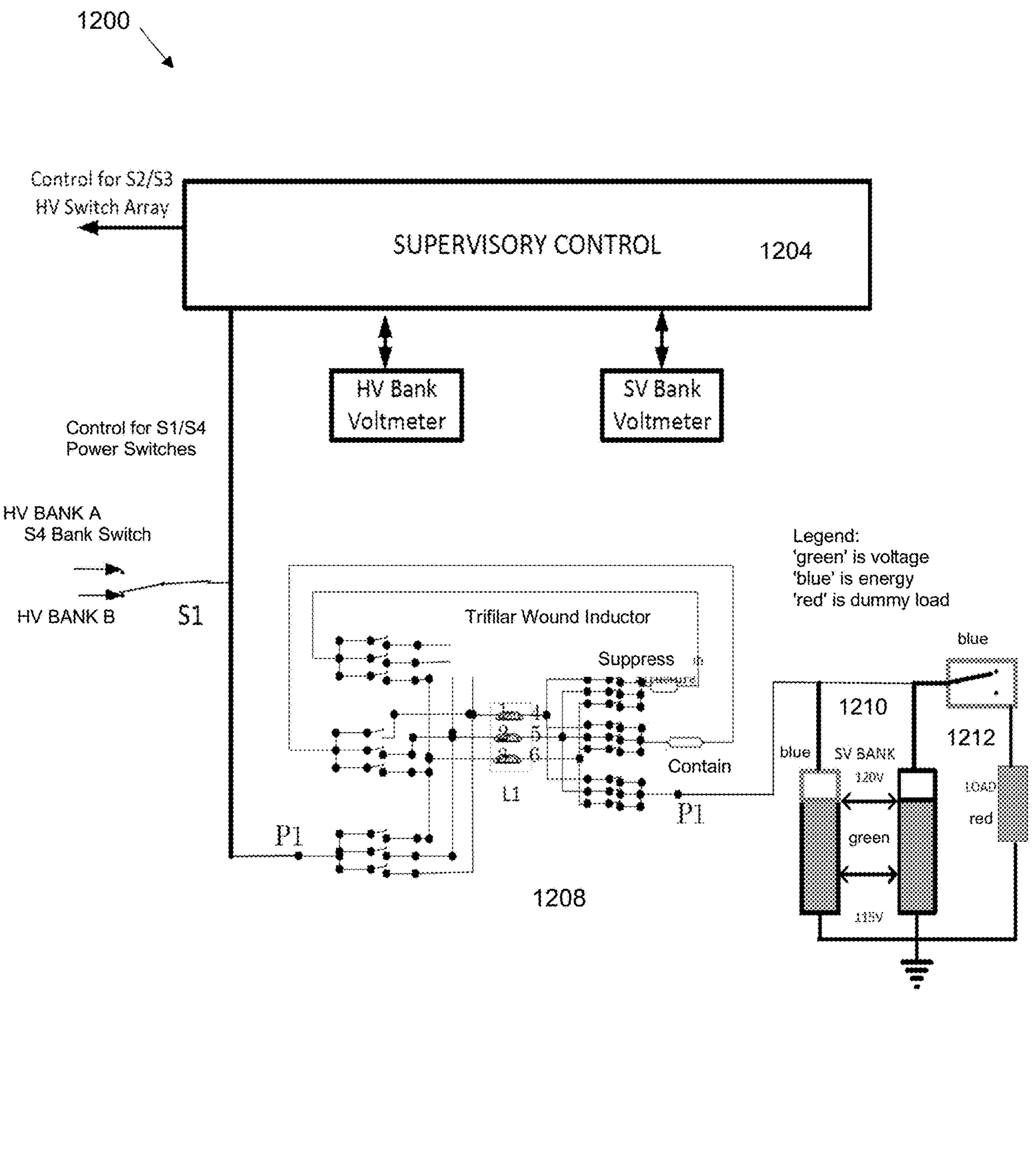
FIG. 12 illustrates an energy transform system using a multimode, multifilar inductor system of FIG. 7, under some embodiments.

The inductor circuit 1108 of system 1100 may be implemented by a multimode, multifilar inductor circuit to provide many selections of inductor operating mode, such as shown in FIG. 7. FIG. 12 illustrates an energy transform system using a multimode, multifilar inductor system of FIG. 7, under some embodiments. As shown in FIG. 12, system 1200 contains a trifilar wound inductor L1 with suppression and containment structures in conjunction with a switching matrix, as illustrated in FIG. 7. Such a circuit 1208 is used by a supervisory control circuit to control voltage levels to a load through an HV bank and SV bank as described above with respect to FIG. 11.

Switching Modes

As stated above, an embodiment includes a switching matrix that sets the circuit containing the multifilar inductor to one of several different modes. These modes are used to extend a duty cycle of the circuit to optimize the adiabatic gradient versus the diabatic divergence illustrated in FIG. 6. As can be seen in graph 600 of FIG. 6, the adiabatic gradient vs. diabatic divergence curve illustrates that increasing the duty cycle or energy approaches that gradient such that the winding may incur thermal absorption. With respect to the switching matrix and inductor circuit 1208 of FIG. 12, this means that switching winding P1 to an adjacent winding manifestly cuts the duty cycle is cut in half, at least theoretically (the actual duty cycle reduction depends on variables of the circuit and the components). With the trifilar inductor 300 of circuit 1208, the three windings allow the duty cycle to be cut down even further. Allowing the P1 winding to be switched between the other windings (T and B) reduces the duty cycle, thereby allowing a decrease in the size of the conductors comprising the windings, and an even power increase across the inductor. This is essentially a vector transformation.

To further expand on this feature, in certain embodiments, the pulse-power across the inductor windings may be such that, for a current I, there may be a thermal energy $I^2R$ loss absorbed by the inductor. The principle (but not all) variables are given by Equation 6.0, where the loss (or said as a thermal source), the inductor's thermal resistance, and its thermally exposed vulnerability variables may be expressed as:

$$I^2 R \times (\theta = \Delta T / P) \times DC \quad \text{[Equation 6.0]}$$

In this equation, R is the windings' total resistance; θ=ΔT/P represents the thermal resistance of the inductor, and DC is the duty cycle. Where duty cycle=$t_{on}/(t_{on}+t_{off})$ of the on-time of the pulse power is a ratio of its off-time. In general, the lower the DC, the less vulnerability of the inductor absorbing thermal energy. Whereas the higher the DC, the more likely the vulnerability to a thermal energy transform by the inductor. These effects are summarized in FIG. 6, which shows that the left curve 604 is the adiabatic loading boundary or gradient, and the right curve 602 is the diabatic absorption or divergence.

In an embodiment that uses a switching matrix to enable switching a multifilar-wound inductor's power winding P1 between the windings, the duty cycle may be reduced such that the inductor is further protected against temperature rise. Thus, for example, by switching of P1 to an adjacent winding manifestly the duty cycle is (theoretically) cut in half. Embodiments of FIG. 12 thus allow P1 switching between multifilar windings to be between either (1) the SV Bank charging period or (2) such periods between power pulses, which is denoted as $R_{LOAD}$. These modes are denoted as the P1+C (P1+Charge) mode for switching in case (1), and the P1+$R_{LOAD}$ (P1+Pulse) mode for switching in case (2), with the + denoting a switched P1.

Each of these two modes may further be sub-classified into power features, which are essentially controlled by the load 1212. With less than a full load (that is, the designed maximum), no switching is needed. FIG. 14 illustrates a table 1400 that lists the different loads for the different P1 switching modes, under some embodiments. As shown in Table 1400, the modes are as follows: Mode P1+C is continuous full load; Mode P1++C is continuous full load, where the ++ denotes switching P1 continuously between charging the SV Bank; Mode P1+$R_{LOAD}$ is occasional overload; Mode P1++$R_{LOAD}$ is intermittent overload, and Mode P1++P1 is a last resort power switching two windings in parallel.

Figure 13:
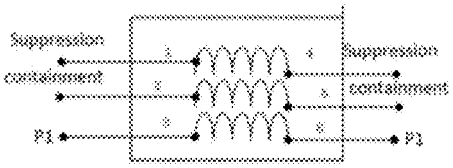
FIG. 13 is a set of charts that illustrate settings of a switch array to configure modes of the inductor circuit, under some embodiments.
Figure 13:
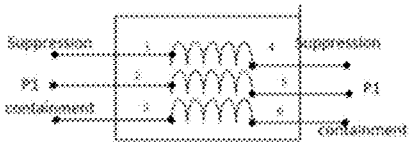
Figure 13:
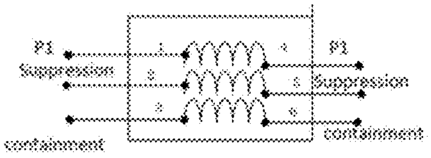

With respect to FIG. 12, in general, the duty cycle is relative to variations of the load 1212 and is governed by the total capacitance of the toxoid windings plus the SV bank 1210. That is, the energy transformed per pulse plus the number of pulses required to charge the SV Bank to the useful voltage. Thus, for example, if the SV Bank size (in capacitance) was set at 125V, such that a constant 150 load would take 5 seconds to discharge down to 114V, then, a 70 load would take 10 seconds to discharge down to 114V. If, however, the load demands for a short period were 30 kJ, then the circuit must enable S1 every 2.5 seconds. It can thus be seen that there can be a wide range of duty cycles. For the embodiment of FIG. 12, the multimode (or duty-cycle extender) mechanism allows for a wide range of duty cycle, FIG. 13 is a set of charts that illustrate settings of the switch array to configure modes of the inductor circuit, under some embodiments. In FIGS. 13, S21, S22, and S23 denote the three multimode switches shown in diagram 700 of FIG. 7. The individual pin assignments for these switches are identified charts 1302, 1306, and 1310 of FIG. 13. Each of these charts switches the connections between the P1 winding and the suppression and containment circuits according to the respective circuit diagram 1304, 1308, and 1310. Thus, chart 1302 shows the pin assignments for switches S21*a*, S22*a*, and S23*a* for circuit 1304, chart 1306 shows the pin assignments for switches S21*b*, S22*b*, and S23*b* for circuit 1308, and chart 1310 shows the pin assignments for switches S21*c*, S22*c*, and S23*c* for circuit 1312. The suppression winding is shorted and may be optionally connected by a steering diode, as shown in FIG. 8. Also, as stated above, the containment winding is extended in a circular pattern over the top of the toroid and below the toroid, and is optional. A double or even triple overlay may be embodied for values into the noise levels, such as on the order of 40 dBm or so.

The switch matrix allows the P1 winding to be switched between the three windings, T, B, and P. The goal is to switch P1 such that if the #1 winding at P pushes the boundary as shown per chart 600 in FIG. 6 between adiabatic loading and diabatic temp rise.

Figure 15A:
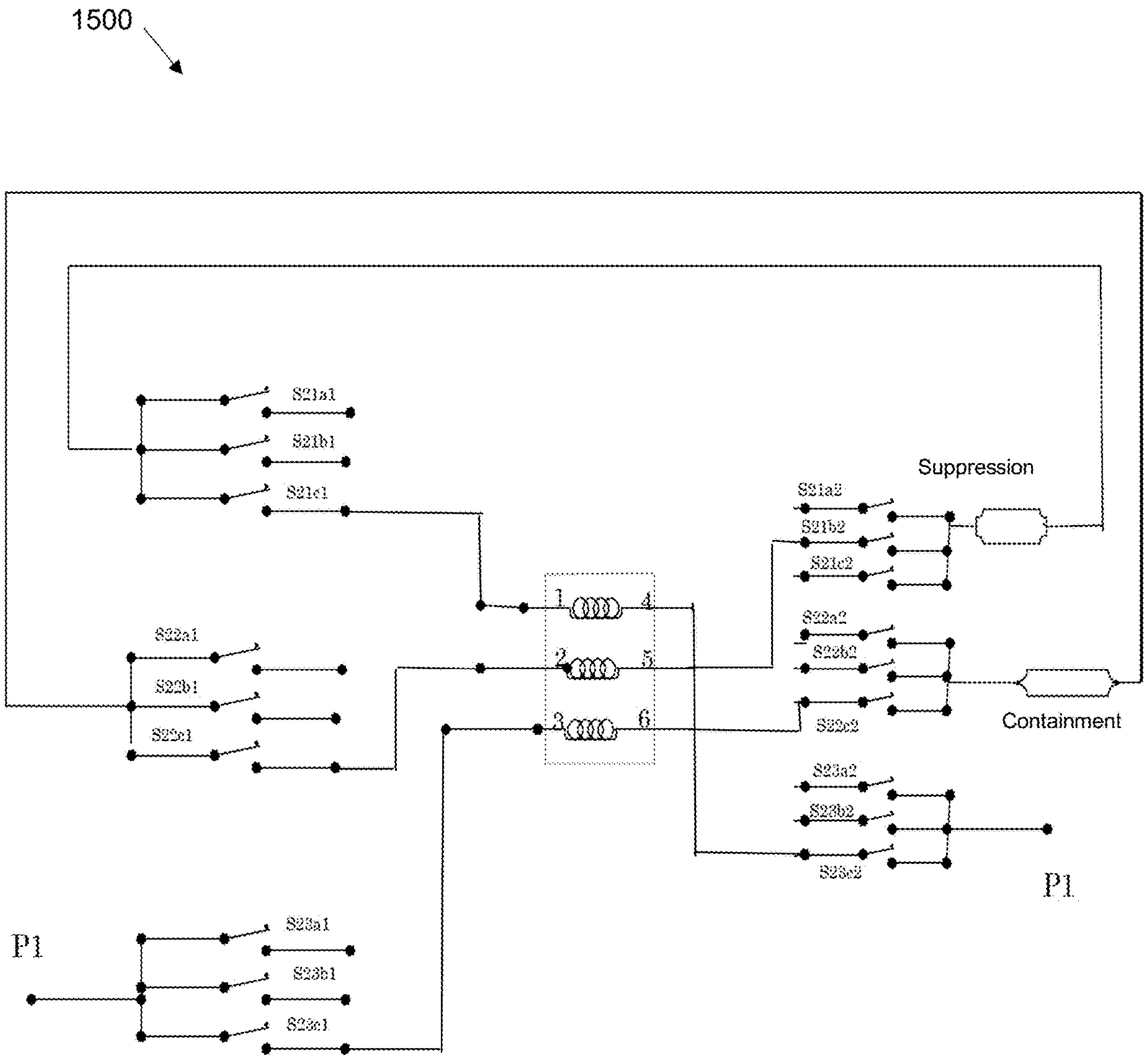
FIG. 15A illustrates the circuit of FIG. 7 with a specific switch configuration for a winding P1 of FIG. 13.
Figure 15B:
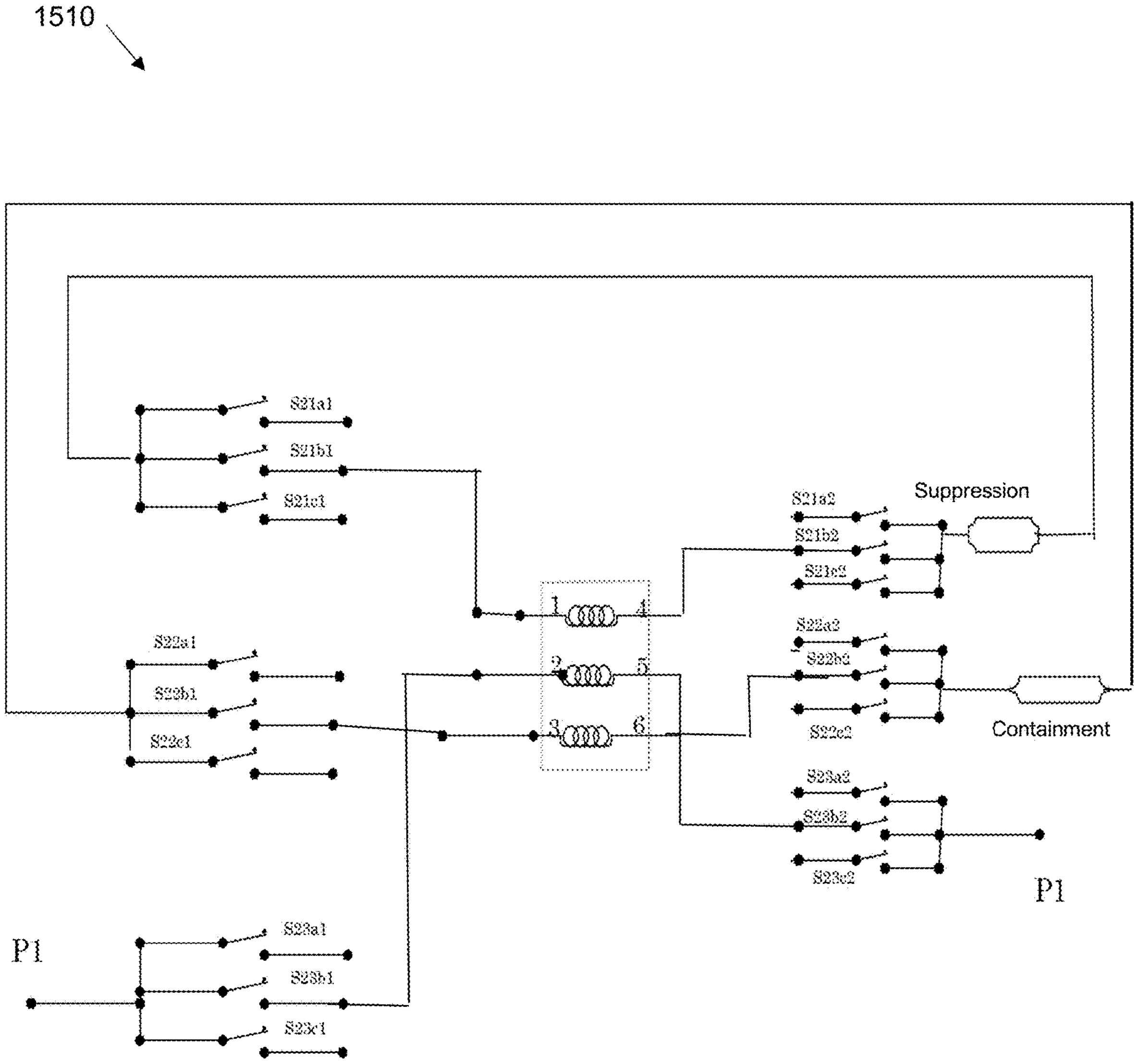
FIG. 15B illustrates the circuit of FIG. 7 with a specific switch configuration for another winding P1 of FIG. 13.
Figure 15C:
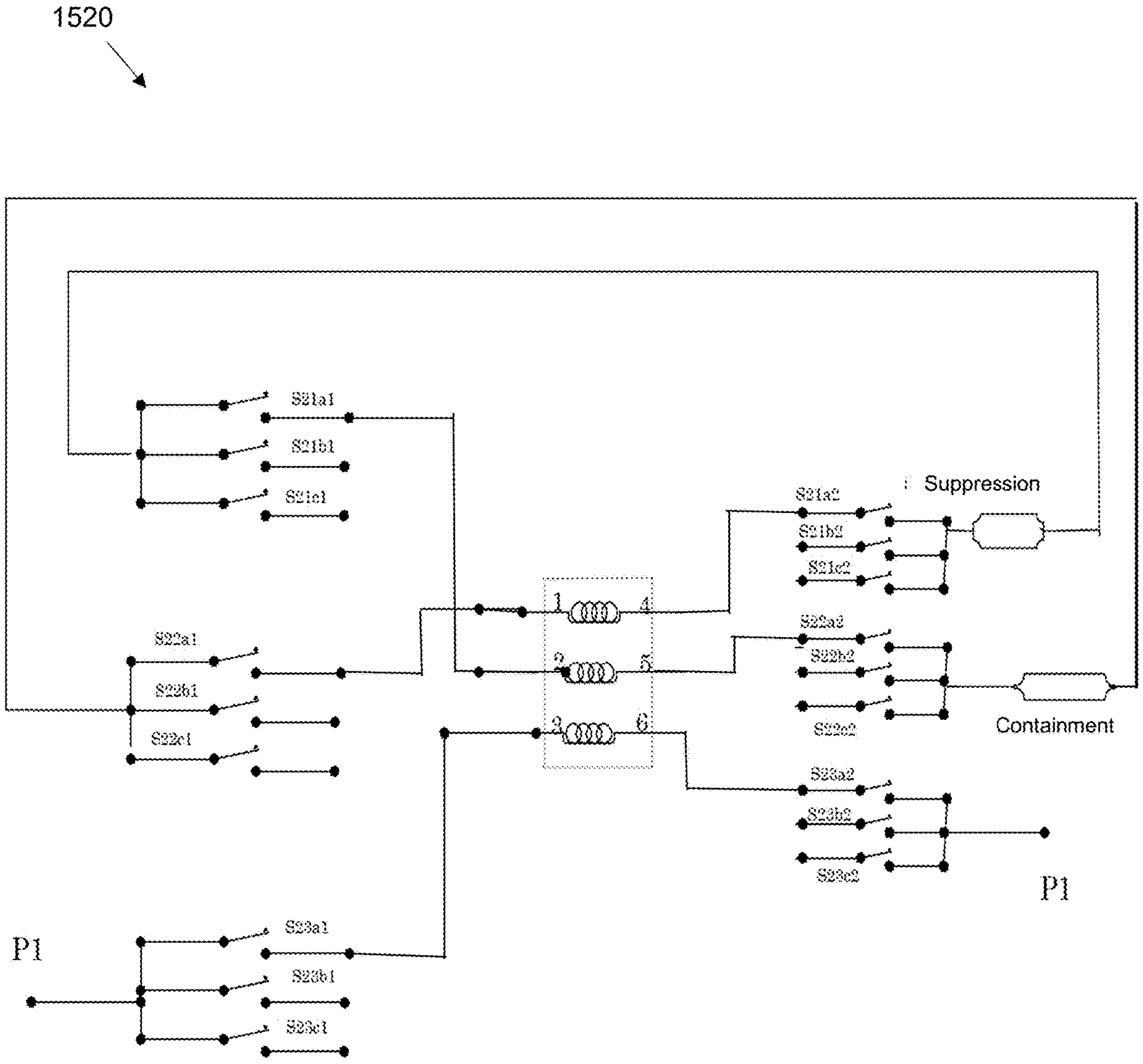
FIG. 15C illustrates the circuit of FIG. 7 with a specific switch configuration for yet another winding P1 of FIG. 13.

FIGS. 15A, 15B, and 15C illustrate the circuit 700 of FIG. 7 illustrated with specific switch configuration for winding P1 as corresponding to the respective charts 1302, 1306, and 1310 of FIG. 13. For these diagrams, all switches are 1 of 3 and are shown in the open position.

FIG. 15A illustrates the circuit of FIG. 7 with a specific switch configuration for winding P1 corresponding 1302 of FIG. 13. This circuit illustrates the connections of winding P1 with pins 1 to 4 of circuit 800.

FIG. 15B illustrates the circuit of FIG. 7 with a specific switch configuration for winding P1 corresponding 1306 of FIG. 13. This circuit illustrates the connections of winding P1 with pins 2 to 5 of circuit 800.

FIG. 15C illustrates the circuit of FIG. 7 with a specific switch configuration for winding P1 corresponding 1310 of FIG. 13. This circuit illustrates the connections of winding P1 with pins 3 to 6 of circuit 800.

The switching configuration of FIGS. 15A-C are provided for example only, and other switching circuits and configuration are also possible to achieve the winding switching of multifilar toroidal inductor 300 under other embodiments.

In an embodiment, a temperature sensor may be included or associated with each winding. The temperature sensor may be embodied as a thermistor, RTD (resistance temperature detector). Such sensors are used to measure temperature, and may consist of a fine, pure metal wire (e.g., nickel, copper, platinum) wrapped around a core (e.g., ceramic or glass). It measures temperature as a function of resistance. In an embodiment, the temperature sensor may also be implemented as a wide-angle thermal camera to cover the inside area of the toroid. A number of thermistors may also be placed between the outside windings. Placement between the inside windings is also possible, but due to a possible sine effect where the inside windings are tight, there is usually more space between outside windings. The temperature sensor detect increases in temperature during inductor use above a defined threshold. Any such temperature increase must be a result of the P1 winding, however identifying the exact winding is not necessary. Only a specific temperature rise in the inductor as a whole needs to be detected. Such a temperature increase can then be used to trigger the switching of P1.

Although certain embodiments have been described and illustrated with respect to certain example configurations and components, it should be understood that embodiments are not so limited, and any practical configuration, composition, operating ranges or selection of components is possible. Likewise, certain specific value and operating parameters are provided herein. Such examples are intended to be for illustration only, and embodiments are not so limited. Any appropriate alternative may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method of efficiently transforming energy using a multifilar inductor with at least three switchable windings, comprising:

providing, as part of the inductor, a power assigned winding denoted as P1, a suppression component assigned winding denoted as B, and a containment component assigned winding denoted as T;

switching, through a switching apparatus, assignments between the P1, B and T windings;

suppressing, by the B winding, back Electromagnetic Force (EMF) generated by a pulse power generator and input to P1, wherein the T winding contains a field emitted EMF created by pulse power from the pulse power generator; and converting input pulse power to a constant current output into a capacitor bank coupled to the inductor.

2. The method of claim 1 further comprising switching assignments between multifilar windings to be either a service voltage bank charging period, or a period between power pulses of the pulse power.

3. The method of claim 1 wherein the converting step extends a time duration of the input pulse power by a combination of the at least three switchable windings plus the capacitor bank to thereby minimize a peak inductance below a saturation point of the inductor.

4. The method of claim 2 wherein the P1, B, and T windings are wrapped adjacent to one another around a core, and wherein a first end of each winding forms a first lead and a second end of each winding forms a second lead, and further wherein the windings are wrapped around the inductor such that the second lead of each winding terminates at a set distance on the core from the first end of each winding.

5. The method of claim 4 wherein each winding comprises a copper conductor wire, and wherein the core is one of air or a ferrite material.

6. The method of claim 2 further comprising providing a respective temperature sensor associated with each of the P1, B, and T winding.

7. The method of claim 1 wherein a suppression component having the suppression component winding comprises a steering diode, and wherein a containment component having the containment component assigned winding comprises a section of coiled wire disposed along at least a first surface of the inductor.

* * * * *